Feb. 9, 1932.  V. H. PATRIARCHE  1,844,227
VARIABLE PITCH PROPELLER
Filed April 5, 1930
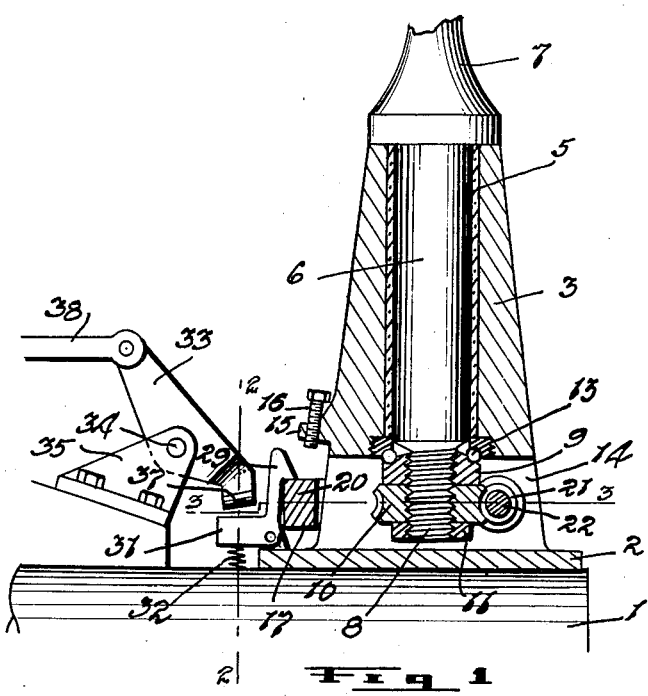
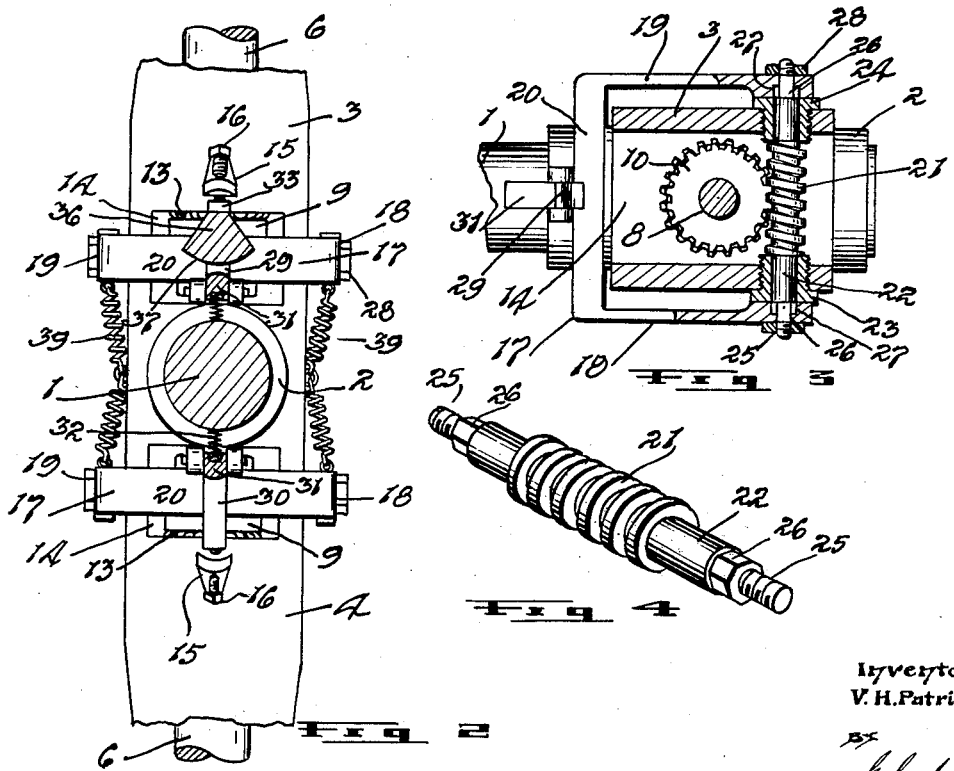
Inventor
V. H. Patriarche
By
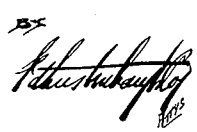

Patented Feb. 9, 1932

1,844,227

UNITED STATES PATENT OFFICE

VALANCE H. PATRIARCHE, OF WINNIPEG, MANITOBA, CANADA

VARIABLE PITCH PROPELLER

Application filed April 5, 1930. Serial No. 441,978.

This invention relates to means for producing a variable pitch in propeller blades such as used on aeroplanes. In the use of aeroplanes, it is desirable in starting to have the propeller blades so positioned that they will have a small pitch and when the machine has raised from the ground, to then increase the pitch. The amount of the increase of pitch is, however, varied according to the speed that it is desired to have the plane make.

An object of the invention is to provide a means for adjusting the propeller blades to increase the pitch when desired, such being brought about by the aviator at the proper time, the device being readily controlled at the cockpit by suitable means therein provided.

A further object of the invention is to construct the invention in a simple, durable and inexpensive manner, all parts being readily accessible, the parts readily adjustable to give the desired increased pitch as desired and the structural details such that the device can be mounted on the ordinary propeller shaft.

A further object is to construct the parts so that when the aviator trips the catch or dog provided, the blades automatically change to their position of greatest pitch.

With the above more important objects in view, the invention consists essentially in the arrangement and construction of parts hereinafter more particularly described, reference being had to the accompanying drawings, in which:—

Fig. 1 is a vertical sectional view through the hub of the propeller, certain parts being shown in side elevation.

Fig. 2 is a vertical sectional view at 2—2 Figure 1.

Fig. 3 is a horizontal sectional view at 3—3 Figure 1, certain parts being shown in plan view.

Fig. 4 is a perspective view of the worm shaft.

In the drawings like characters of reference indicate corresponding parts in the several figures.

The forward end of the crank shaft 1 of the aeroplane engine is herein shown and on the forward end of the shaft, I mount in any suitable manner, the hub 2 which turns with the shaft.

This hub carries two similar diametrically opposing and radially extending hub extensions 3 and 4, each of which receives a cylindrical bushing 5 in which the spindle 6 at the inner end of the root 7 of the blade is rotatably mounted, it being understood that there are two similar metal blades customarily used. The inner end of the spindle in each instance is reduced and screw threaded as indicated at 8 and on the screw threaded end thereof I mount a cone 9, a worm wheel 10 and a retaining nut 11, ball bearings 13 being inserted between the cone and the inner end of the hub casting, it being here understood that the hub casting is provided with a cross opening 14 adjacent to the hub to receive such parts. The arrangement so provided is such that when the worm wheel is rotated, the propeller will be rotated and also such that the ball bearings take the thrust when the device is in use.

Each of the hub extensions is provided on the rear side and above the rear end of the opening 14 with an extending lug 15 screw-threaded to receive an adjusting screw 16. A weighted yoke-shaped, horizontal lying, control lever 17 spans the hub extension in each instance, the side arms 18 and 19 thereof being resilient while the cross going portion 20 is comparatively thick to give increased weight at such point. A worm 21 meshes continuously with the worm wheel of each spindle, the worm being carried by the worm shaft 22 which is mounted in bearings 23 and 24 screw threaded into the side walls of the opening 14. The ends of the worm shaft are reduced and screw threaded as indicated at 25 and adjacent the screw threaded ends, I have formed the shaft with hexagonal heads 26 and these heads are adapted to enter complementary sockets 27 provided in the forward ends of the arms 18 and 19 so that the worm will be positively compelled to rotate with the side arms.

The ends 25 project through the arms 18 and 19 and fastening nuts 28 are applied thereon. The end thrust of the worm shaft is taken up in the bearings 23 and 24 and the arrangement provided permits one to spring the arms 18 and 19 off the end of the worm shaft when it is desired to change the initial pitch of the blades, this latter being accomplished at such time by applying a suitable tool such as a wrench to the end of the worm shaft and turning it until the desired initial blade pitch is obtained. Afterwards, one will replace the arms 18 and 19 and tighten up the nuts 28, the arms of course being retained in their initial position.

The inner end of the hub carries pivotally two similar latches, catches or dogs 29 and 30 and the latch in each instance, is adapted to engage with the cross portion 20 of the release lever and lock the same against outward movement as occurs due to centrifugal force when the crank shaft is rotated. The latch is provided in each instance with a tail 31 and a relatively light coiled spring 32 is interposed between the tail and the crank shaft in each instance and operates to hold the latch normally in its locked position.

A trigger 33 is pivotally mounted at 34 in a bracket 35 secured to any suitable adjacent stationary part of the aeroplane. The lower end of the trigger terminates in a segment 36 presenting an arcuate face 37 overlying the tail of the catch and the upper end of the trigger is attached to the forward end of an operating rod 38 passing to within convenient range of the aviator in the cockpit. It will be observed that when the latch is unlocked and the release lever flies out under the action of centrifugal force, its outermost position is limited by the adjusting screw 16 so that the set of this screw controls the amount of lead the blades are given.

When this device is applied on an aeroplane, the aviator will initially set the blades so that they have the desired initial pitch which he wishes, such as say 10 degrees, the initial setting being accomplished by turning the worm shafts with a suitable tool before the arms 18 and 19 have been put finally into place. Subsequently the screws 16 will be adjusted as experience shows, the amount of rotation permitted the blades depending entirely on the amount the set screws are screwed in or out.

When the aeroplane is starting from rest, the yokes or release levers will be locked by the latches and the propeller blades will at such time have only a small degree of lead. When the machine has raised from the ground and is nicely running and the aviator desires to increase the speed thereof, he causes the rod 38 to be moved endwise forwardly and this rocks the trigger and passes the arcuate face 37 thereof into the path of travel of the tails of the latches with the result that the latches are tripped to release the yokes and the instant the yokes are released, they fly out under the action of centrifugal force until they are arrested by contact with the inner ends of the screws 16. At such time, the blades have their maximum angular position or lead.

Springs 39 are attached to the side arms 18 and 19 and to the hub 2 and these springs operate to reset the release levers in their initial position upon the speed of the crank shaft materially reducing. Obviously when the strength of the springs 39 becomes greater than the acting centrifugal force, the release levers will move in and become caught again by the latches, it being of course understood that the trigger has been previously pulled out of the path of the tails 31.

What I claim as my invention is:—

1. In a variable pitch propeller, in combination, a plurality of blades having their inner ends mounted to permit of rotation of the blades around their longitudinal axis, a worm wheel secured to the inner end of each blade, a rotatably mounted worm shaft continuously meshing with each worm wheel, a weighted member associated with each worm shaft and adapted to swing out under the action of centrifugal force and effect the rotation of the associated blade in a direction to increase the pitch thereof and manually released means for locking the weighted members against swinging outwardly.

2. In a variable pitch propeller, in combination, a plurality of blades having their inner ends mounted to permit of rotation of the blades around their longitudinal axis, a worm wheel secured to the inner end of each blade, a rotatably mounted worm shaft continuously meshing with each worm wheel, a weighted member secured to each worm shaft and adapted to swing out under the action of centrifugal force and effect the rotation of the associated blade in a direction to increase the pitch thereof, manually released means for locking the weighted members against swinging outwardly and adjustable means engageable with the out swinging weighted members to limit their out swung position.

3. In a variable pitch propeller, in combination, a plurality of blades having their inner ends mounted to permit of rotation of the blades around their longitudinal axis, a worm wheel secured to the inner end of each blade, a rotatably mounted worm shaft continuously meshing with each worm wheel, a weighted member carried by each worm shaft and adapted to swing out under the action of centrifugal force and effect the rotation of the associated blade in a direction to increase the pitch thereof, means engageable with each weighted member to limit the swung out position thereof under the action of centrifugal force, manually released means normally locking the weighted members against swinging outwardly and spring means for returning the weighted members to their original locked position upon the acting centrifugal force diminishing.

4. In a variable pitch propeller, the combination with the propeller shaft, of a hub secured to the shaft and provided with a plurality of radially disposed bearing members, propeller blades having spindles rotatably mounted in said bearing members, a worm wheel secured to the inner end of each spindle, a rotatably mounted worm shaft carried by each bearing member and continuously engaging the adjacent worm wheel and a weighted member mounted on each worm to effect through the worm shaft and worm wheel the rotation of the blade to increase its pitch in the swinging out movement of the weighted member under the action of centrifugal force and means limiting the swung out position of each weighted member.

5. In a variable pitch propeller, the combination with the propeller shaft, of a hub secured to the shaft and provided with a plurality of radially disposed bearing members, propeller blades having spindles rotatably mounted in said bearing members, a worm wheel secured to the inner end of each spindle, a rotatably mounted worm shaft carried by each bearing member and continuously engaging the adjacent worm wheel, a weighted member detachably connected to the worm shaft to permit of the adjustment when detached of the initial pitch of the blade through the turning of the worm, said attached weighted member being also adapted to swing out under the action of centrifugal force and effect the rotation of the blade to increase the pitch thereof and means limiting the swung out position of each weighted member.

6. In a variable pitch propeller, the combination with the propeller shaft, of a hub secured to the shaft and provided with a plurality of radially disposed bearing members, propeller blades having spindles rotatably mounted in said bearing members, a worm wheel secured to the inner end of each spindle, a rotatably mounted worm shaft carried by each bearing member and continuously engaging the adjacent worm wheel, a weighted member detachably connected to the worm to permit of the adjustment when detached of the initial pitch of the blade through the turning of the worm, said attached weighted member being also adapted to swing out under the action of centrifugal force and effect the rotation of the blade to increase the pitch thereof, means limiting the swung out position of each weighted member, manually tripped means normally locking each weighted member against outward swing and spring means for returning the released weighted members to their original locked position upon the acting centrifugal force diminishing.

7. The combination with a propeller shaft, of a hub secured to the shaft and provided with a plurality of radially disposed hub extensions forming bearing members, said extensions being each longitudinally slotted adjacent the hub, propeller blades provided with spindles rotatably mounted in the bearing members, a worm wheel located in each slot and secured to the inner end of the spindle, a worm rotatably carried by each bearing member and continuously meshing with the adjacent worm wheel, a weighted member associated with each hub extension, said weighted member being in the form of a yoke spanning the extension and having the ends thereof attached to the ends of the worm, means carried by each extension limiting the out swung position of each weighted member under the action of centrifugal force, a latch normally locking each weighted member against outward swing, the latches being pivotally carried by the hub, trip means manually operable from a distant point and engageable with the latches to release the same and spring means connecting the weighted members to the hub and adapted to return the weighted members to their original locked position upon the acting centrifugal force diminishing.

8. The combination with a propeller shaft, of a hub secured to the shaft and provided with a plurality of radially disposed hub extensions forming bearing members, said extensions being each longitudinally slotted adjacent the hub, propeller blades provided with spindles rotatably mounted in the bearing members, a worm wheel located in each slot and secured to the inner end of the spindle, a worm rotatably carried by each bearing member and continuously meshing with the adjacent worm wheel, a weighted member associated with each hub extension, said weighted member being in the form of a yoke spanning the extension and having the ends thereof adjustably attached to the ends of the worm to permit of the initial varying of the pitch of the blade, means carried by each extension limiting the out swung position of each weighted member under the action of centrifugal force, a latch normally locking each weighted member against outward swing, the latches being pivotally carried by the hub, trip means manually operable from a distant point and engageable with the latches to release the same and spring means connecting the weighted members to the hub and adapted to return the weighted members to their original locked position upon the acting centrifugal force diminishing.

Signed at Sioux Lookout, Ont., this 18th day of December, 1929.

VALANCE H. PATRIARCHE.